Patented Dec. 17, 1929

1,740,079

UNITED STATES PATENT OFFICE

THOMAS A. EDISON, OF WEST ORANGE, NEW JERSEY, ASSIGNOR TO EDISON BOTANIC RESEARCH CORPORATION, OF WEST ORANGE, NEW JERSEY, A CORPORATION OF NEW JERSEY

EXTRACTION OF RUBBER FROM PLANTS

No Drawing.   Application filed November 30, 1927. Serial No. 236,882.

My invention relates to the extraction of rubber from plants containing the same and is particularly directed to the extraction of rubber from small plants, such as herbs and shrubs, having but a small content of rubber.

The principal object of my invention is to provide an improved process, preferably in which all the steps can be carried out mechanically, which renders the extraction of rubber from plants in which the rubber content is very small, commercially practicable.

The production of rubber by the growth and cultivation of certain small plants in the nature of shrubs, notably guayule, and the treatment of such plants when they reach the proper condition of growth, to extract the rubber therefrom, has been carried on extensively for a good many years. One process commonly employed in obtaining rubber from such plants is as follows: The plants when they reach the desired condition are reaped, dried, and then crushed by passing the same through crushing rolls or other suitable machinery, after which the entire crushed mass is reduced to a very fine pulp in ball mills. The pulp thus produced is transferred from the ball mills to tanks and allowed to settle until the woody material contained in the pulp becomes water-logged and sinks to the bottom of the tanks. During this settling operation most of the rubber particles present in the pulp, which particles are agglomerated by the action of the ball mills in producing the pulp, rise to the surface of the water in the tanks and are floated off. In this connection it is noted that the rubber particles are lighter than water and also lighter than the water-logged woody material.

The process just described is extensively used where the plants treated contain a considerable quantity of rubber, as for example 8 to 10% by weight; but is of no value where the rubber content of the plants is small, as for example 2% or less by weight, because of the fact that with this process, as well as with similar processes heretofore used, the rubber content of the waste material resulting from the process is high (as much as 20% of the whole in the case of plants containing 10% of rubber), and it has heretofore been impossible to reduce this loss.

My process is an improvement on that hereinbefore described and is especially designed for the treatment of plants in which the rubber content is very small, as for example from 1% down to ½ of 1% or less. My improved process may be conveniently divided into two stages which may be appropriately termed the "debarking and depithing" stage, and the "extracting" stage.

A majority of those plants which may be readily grown and cultivated and which contain rubber in small quantities, have in their make-up a large amount of hard woody material. This woody material usually contains no appreciable quantity of rubber, the latex or rubber material being almost entirely contained either in the bark or in the bark and pith. In accordance with my improved process I first treat the plants so as to separate the portion thereof containing practically no rubber, that is the hard woody material, from the rubber containing portion thereof, namely, the bark and pithy material, and then further treat only the latter portion for the purpose of extracting the rubber therefrom.

In carrying out my improved process the plants to be treated, after being reaped and dried, are first crushed so as to open up the pith seams and break the bark, as by passing the plants through crushing rolls or other suitable machinery. The crushed plants are cut into short pieces, preferably pieces approximately one-half inch (½") long, and these pieces are soaked in water until the bark and pithy material are rendered quite soft. This soaking does not appreciably soften or affect the hard woody material. The entire mass of material is then introduced into one or more water-filled ball mills equipped with but a small number of balls, and subjected to the action of such mills until the bark and pithy material are practically entirely separated from the hard woody material. This woody material in many plants constitutes as much as eighty per cent (80%) of the entire weight and is substantially useless in so far as obtaining rubber therefrom is concerned. In the subjection of the material to the action of the ball mills the softened bark and pithy material are reduced to a pulp which is in suspension in the water, while the pieces of hard woody material are practically unaffected as they are not disintegrated but remain uncrushed. The operation just described proceeds very rapidly, it requiring only about one (1) hour to thus completely separate the bark and pithy material from the woody material of most plants. The entire contents of the ball mill or mills is then screened through a screen of suitable mesh and washed, with the result that all of the hard woody material is retained by the screen. The woody material thus retained by the screen is very clean and almost snow-white and in the case of some plants, this woody material can probably be advantageously utilized for making paper. The steps of my improved process so far described constitute what I please to call the first stage of the process and can, where suitable, be very easily carried out on the farm where the plants are grown.

In carrying out the second stage of my improved process the bark and pith pulp produced and separated from the woody material of the plants by the first stage of the process, is first introduced into one or more ball mills and ground into an impalpable pulp. During this grinding operation the rubber particles are freed from the rest of the solid material and agglomerated. The contents of the ball mill or mills is then removed and introduced into settling tanks where the agglomerated rubber particles rise to the surface of the water and the remaining solid material settles to the bottom. After a suitable period the rubber particles on the surface of the water are floated off.

With my improved process it is practicable, from a commercial standpoint, to treat plants containing but a very small amount of rubber, as it is possible thereby to obtain rubber in appreciable quantities from the material of such plants which is subjected to the steps of the second or "extracting" stage of the process. This is due to the fact that such material is the valuable rubber containing material of the plants which has, as the result of carrying out the first stage of the process, been separated from the rest of the material and concentrated into a small bulk so enriched in rubber as to render it practicable to extract rubber therefrom by the second or "extracting" stage of my process.

In carrying out the first stage of my improved process the bark and pithy material, after being separated by screening, as described above, from the woody material of the plants being treated, is, of course, more or less in a state of suspension in water; and where this stage of the process is carried out on the farm where the plants are grown, the bark and pith pulp are separated from the water by settling, after which it is strained, dried on a film dryer and pressed into cakes. As indicated above this pulp will be of small bulk and will have a high rubber-content as compared with the entire mass of the plants. This valuable rubber-containing pulp may then be shipped to a central plant for subjection to the second or "extracting" stage of my process.

While I have described a preferred manner in which my improved process may be carried out, it is to be understood that the process is subject to various changes and modifications without departure from the spirit of my invention or the scope of the appended claims. It is also to be understood that my improved process, while especially designed for the treatment of plants containing but small amounts of rubber, may also be advantageously used in the case of plants having a high rubber-content.

Having now described my invention, what I claim as new and desire to protect by Letters Patent is as follows:

1. The process of extracting rubber from plants containing the same which consists in separating the bark and pithy material of the plants from the woody material thereof without disintegrating the latter material, and then treating only the said bark and pithy material to extract the rubber therefrom, substantially as described.

2. The process of extracting rubber from plants containing the same which consists in separating the woody material of the plants from the rest of the material thereof, then reducing only the latter material to an impalpable pulp and then separating the rubber from the rest of the material of said pulp by flotation, substantially as described.

3. The process of extracting rubber from plants containing the same which consists in separating from the rest of the material of the plants the rubber-containing material thereof and concentrating the latter in a mass of small bulk, then finely grinding only the concentrated mass of rubber-containing material and then separating the rubber from the rest of the solid material in the resulting finely ground mass in a settling tank by settling and flotation, substantially as described.

4. The process of extracting rubber from plants containing the same which consists in crushing the plants, dividing the crushed plants into small pieces, soaking the said pieces with water until the bark and pithy material thereof are softened, passing the soaked pieces through a water-filled ball mill until the bark and pithy material thereof are reduced to a pulp and without crushing the woody material of such pieces, then screening the material passed through the ball mill to separate said pulp from said woody pieces, then finely grinding said pulp, and separating the rubber from the rest of the solid material of said finely ground pulp by flotation and settling in a settling tank, substantially as described.

5. The process of extracting rubber from plants containing the same which consists in separating the bark and pithy material of the plants from the rest of the material thereof, then reducing only the said bark and pithy material to an impalpable pulp, and then separating the rubber from the rest of the material of said pulp by flotation and settling, substantially as described.

6. The steps in the process of extracting rubber from plants containing the same which consist in crushing the plants to open up the pith seams and break the bark, and then separating the bark and pithy material from the woody material of the plants without disintegrating such woody material, substantially as described.

7. The steps in the process of extracting rubber from plants containing the same, which consist in opening up the pith seams and breaking the bark of the plants, then cutting the plants into small pieces, soaking the said pieces with water and then passing the same through a ball mill, substantially as described.

8. The steps in the process of extracting rubber from plants containing the same, which consist in crushing the plants, dividing the crushed mass into small pieces, then reducing the bark and pithy material of the plants to pulp without disintegrating the woody material of the plants, and then separating the said pulp from the woody material, substantially as described.

9. The steps in the process of extracting rubber from plants containing the same, which consist in opening up the pith seams and breaking the bark of the plants, then dividing the plants into small pieces, softening the bark and pithy material of the said pieces, then passing the said pieces through a ball mill until the bark and pithy material are reduced to a pulp without crushing the woody material of such pieces, and then separating the said pulp from the woody material by screening, substantially as described.

10. The steps in the process of extracting rubber from plants containing the same, which consist in crushing the plants, cutting the crushed plants into small pieces, soaking the said pieces with water until the bark and pithy material thereof are softened, then passing said pieces through a water-filled ball mill until the said bark and pithy material are reduced to a pulp and without crushing the woody material, and then separating said pulp from the woody material by screening, substantially as described.

This specification signed this 25th day of November, 1927.

THOS. A. EDISON.